United States Patent
Reddick

(10) Patent No.: US 7,858,148 B2
(45) Date of Patent: Dec. 28, 2010

(54) FILLER FOR ARTIFICIAL TURF SYSTEM

(75) Inventor: Randolph S. Reddick, Calhoun, GA (US)

(73) Assignee: USGreentech, L.L.C., Cincinnati, OH (US)

( * ) Notice: Subject to any disclaimer, the term of this patent is extended or adjusted under 35 U.S.C. 154(b) by 136 days.

(21) Appl. No.: 11/713,891

(22) Filed: Mar. 5, 2007

(65) Prior Publication Data

US 2007/0160800 A1 Jul. 12, 2007

Related U.S. Application Data

(63) Continuation-in-part of application No. 11/373,885, filed on Mar. 13, 2006, which is a continuation-in-part of application No. 10/811,737, filed on Mar. 29, 2004, now Pat. No. 7,144,609, which is a continuation-in-part of application No. 10/422,129, filed on Apr. 24, 2003, now Pat. No. 6,884,509.

(51) Int. Cl.
*C03B 19/01* (2006.01)
*C03B 19/10* (2006.01)
*B05B 7/00* (2006.01)

(52) U.S. Cl. .................. 427/221; 427/212; 427/215; 427/218; 427/220; 65/21.1; 65/21.2; 65/21.3; 428/403; 428/406; 428/407; 428/87; 428/17

(58) Field of Classification Search .......... 428/87, 428/17, 402, 403, 404, 406, 407; 65/21.1, 65/21.2, 21.3; 427/212, 215, 218, 220, 221
See application file for complete search history.

(56) References Cited

U.S. PATENT DOCUMENTS

| | | | |
|---|---|---|---|
| 2,106,317 A | 1/1938 | Dezendorf | |
| 2,695,851 A | 11/1954 | Lodge | |
| 2,700,003 A | 1/1955 | Gundlach | |
| 2,934,455 A | 4/1960 | Dober | |
| 3,003,643 A | 10/1961 | Thomas | |
| 3,079,209 A | 2/1963 | Boggus | |
| 3,092,836 A | 6/1963 | Boggus | |
| 3,099,574 A | 7/1963 | Bernier | |
| 3,441,362 A | 4/1969 | Streck | |
| 3,443,492 A | 5/1969 | Pleass | |

(Continued)

FOREIGN PATENT DOCUMENTS

| | | | |
|---|---|---|---|
| DE | 195 40 623 A1 | | 5/1997 |
| JP | 05171611 A | * | 7/1993 |
| JP | 2003171908 A | * | 6/2003 |
| WO | 03 042293 A1 | | 5/2003 |
| WO | 2004 056881 | | 7/2004 |

OTHER PUBLICATIONS

JPO machine translation of JP 05-171611 A (1993).*
JPO machine translation of JP 2003-171908 A (2003).*
English translation of JP5171611 in the name of Sekisui Chemical Co., Ltd., published Jul. 9, 1993.
U.S. Patent and Trademark Office, Office Action in related U.S. Appl. No. 11/373,885, dated Mar. 31, 2008, 13pp.

(Continued)

*Primary Examiner*—Cheryl Juska
(74) *Attorney, Agent, or Firm*—Wood, Herron & Evans, LLP

(57) ABSTRACT

Artificial turf for use with an artificial turf system, which may also include a base layer and a support layer. The artificial turf comprising a backing supporting pile tufts of between ¼" to 4" in length, in position on its upper surface. The backing may comprise a porous synthetic foam or backing sheet. A filler of particles shaped to have no sharp edges and of substantially equal size are interspersed over the backing and about the tufts up to at least half thick length. The artificial turf substantially retains its resiliency, porosity and equal density throughout.

34 Claims, 7 Drawing Sheets

U.S. PATENT DOCUMENTS

| | | | | |
|---|---|---|---|---|
| 3,503,771 | A | 3/1970 | Kroyer | |
| 3,513,061 | A | 5/1970 | Vinicki | |
| 3,513,062 | A | 5/1970 | Vinicki | |
| 3,557,038 | A | 1/1971 | Gebura | |
| 3,795,180 | A | 3/1974 | Larsen | |
| 3,917,771 | A | 11/1975 | Basile | |
| 4,188,154 | A | 2/1980 | Izatt | |
| 4,268,551 | A | 5/1981 | Moore, Jr. | |
| 4,356,220 | A | 10/1982 | Benedyk | |
| 4,412,015 | A | 10/1983 | Lustgarten et al. | |
| 4,462,184 | A | 7/1984 | Cunningham | |
| 4,497,853 | A | 2/1985 | Tomarin | |
| 4,606,963 | A | 8/1986 | Farrell | |
| 4,749,479 | A | 6/1988 | Gray | |
| 4,750,909 | A | 6/1988 | Streck | |
| 4,913,596 | A | 4/1990 | Lambert, III | |
| 4,934,865 | A | 6/1990 | Varkonyi et al. | |
| 5,017,040 | A | 5/1991 | Mott | |
| 5,041,320 | A * | 8/1991 | Meredith et al. | 428/87 |
| 5,064,308 | A | 11/1991 | Almond et al. | |
| 5,076,726 | A | 12/1991 | Heath | |
| 5,151,123 | A | 9/1992 | Kviesitis | |
| 5,250,340 | A | 10/1993 | Bohnhoff | |
| 5,254,364 | A | 10/1993 | Kviesitis | |
| 5,264,029 | A | 11/1993 | Kviesitis | |
| 5,306,317 | A | 4/1994 | Yoshizaki | |
| 5,383,314 | A | 1/1995 | Rothberg | |
| 5,411,352 | A | 5/1995 | Eren | |
| 5,458,973 | A | 10/1995 | Jeffs | |
| 5,460,867 | A | 10/1995 | Magnuson et al. | |
| 5,538,787 | A | 7/1996 | Nachtman et al. | |
| 5,583,165 | A | 12/1996 | Kviesitis | |
| 5,618,131 | A | 4/1997 | Weber | |
| 5,688,073 | A | 11/1997 | Brodeur et al. | |
| 5,752,784 | A | 5/1998 | Motz et al. | |
| 5,780,144 | A | 7/1998 | Bradley | |
| 5,820,296 | A | 10/1998 | Goughnour | |
| 5,823,711 | A | 10/1998 | Herd et al. | |
| 5,848,856 | A | 12/1998 | Bohnhoff | |
| 5,849,124 | A | 12/1998 | Rusk, Jr. | |
| 5,908,673 | A | 6/1999 | Muhlberger | |
| 5,950,936 | A * | 9/1999 | Bergart | 241/21 |
| 5,958,527 | A * | 9/1999 | Prevost | 428/17 |
| 6,029,477 | A | 2/2000 | Hanvey, Jr. | |
| 6,168,102 | B1 * | 1/2001 | Bergart | 241/99 |
| 6,221,445 | B1 | 4/2001 | Jones | |
| 6,235,372 | B1 | 5/2001 | Joedicke | |
| 6,238,794 | B1 | 5/2001 | Beesley | |
| 6,263,633 | B1 | 7/2001 | Hagenah | |
| 6,299,959 | B1 | 10/2001 | Squires et al. | |
| 6,338,871 | B1 | 1/2002 | Shin | |
| 6,338,885 | B1 * | 1/2002 | Prevost | 428/17 |
| 6,432,505 | B1 * | 8/2002 | Sweenie et al. | 428/92 |
| 6,443,996 | B1 | 9/2002 | Mihelich | |
| 6,500,543 | B2 | 12/2002 | Ssakai | |
| 6,551,689 | B1 * | 4/2003 | Prevost | 428/143 |
| 6,582,819 | B2 | 6/2003 | McDaniel et al. | |
| 6,610,405 | B2 | 8/2003 | Iriguchi et al. | |
| 6,630,530 | B1 | 10/2003 | Han | |
| 6,632,527 | B1 | 10/2003 | McDaniel et al. | |
| 6,645,627 | B1 | 11/2003 | Rossi | |
| 6,689,447 | B2 * | 2/2004 | Prevost | 428/87 |
| 6,723,412 | B2 * | 4/2004 | Prevost | 428/87 |
| 6,746,752 | B2 * | 6/2004 | Prevost | 428/143 |
| 6,800,339 | B2 | 10/2004 | Motz et al. | |
| 6,818,274 | B1 | 11/2004 | Buck et al. | |
| 6,818,300 | B2 | 11/2004 | Loyd et al. | |
| 6,877,932 | B2 * | 4/2005 | Prevost | 405/38 |
| 6,884,509 | B2 * | 4/2005 | Huff et al. | 428/403 |
| 6,946,181 | B2 * | 9/2005 | Prevost | 428/87 |
| 7,144,609 | B2 * | 12/2006 | Reddick | 428/17 |
| 7,166,340 | B1 * | 1/2007 | Clark | 428/17 |
| 7,300,689 | B2 * | 11/2007 | Prevost | 428/17 |
| 2002/0006481 | A1 | 1/2002 | Morris | |
| 2003/0039511 | A1 * | 2/2003 | Prevost | 405/36 |
| 2003/0182855 | A1 | 10/2003 | Prevost | |
| 2004/0214000 | A1 * | 10/2004 | Huff et al. | 428/404 |
| 2004/0229007 | A1 | 11/2004 | Motz et al. | |
| 2005/0003193 | A1 * | 1/2005 | Stroppiana | 428/407 |
| 2005/0031803 | A1 | 2/2005 | Prevost | |
| 2005/0042032 | A1 | 2/2005 | Motz et al. | |
| 2006/0134374 | A1 * | 6/2006 | Bell et al. | 428/97 |
| 2006/0147670 | A1 * | 7/2006 | Reddick | 428/86 |
| 2007/0160800 | A1 * | 7/2007 | Reddick | 428/87 |
| 2007/0254131 | A1 * | 11/2007 | Shail et al. | 428/95 |
| 2008/0141516 | A1 * | 6/2008 | Julicher et al. | 29/419.1 |
| 2008/0145574 | A1 * | 6/2008 | Julicher et al. | 428/17 |
| 2008/0176009 | A1 * | 7/2008 | Chereau et al. | 428/17 |
| 2009/0011845 | A1 | 1/2009 | Weber | |
| 2009/0011873 | A1 | 1/2009 | Weber | |
| 2009/0226646 | A1 * | 9/2009 | Dlubak et al. | 428/17 |
| 2010/0015448 | A1 * | 1/2010 | Huff et al. | 428/406 |
| 2010/0055461 | A1 * | 3/2010 | Daluise et al. | 428/403 |

OTHER PUBLICATIONS

U.S. Patent and Trademark Office, Office Action in related U.S. Appl. No. 11/373,885, dated Sep. 18, 2008, 12 pp.
U.S. Patent and Trademark Office, Office Action in related U.S. Appl. No. 11/373,885, dated Mar. 3, 2009, 15 pp.
U.S. Patent and Trademark Office, Office Action in related U.S. Appl. No. 10/811,737, dated Feb. 3, 2006, 14 pp.
U.S. Patent and Trademark Office, Office Action in related U.S. Appl. No. 10/811,737, dated May 9, 2006, 8 pp.
U.S. Patent and Trademark Office, Office Action in related U.S. Appl. No. 10/811,737, dated Jul. 25, 2006, 11 pp.
U.S. Patent and Trademark Office, Office Action in related U.S. Appl. No. 10/422,129, dated Oct. 4, 2004, 8 pp.
U.S. Patent and Trademark Office, Office Action in related U.S. Appl. No. 10/422,129, dated Jan. 12, 2005, 8 pp.
Vance Bros. Inc., "Advantage Sport Coating Products" brochure, 3pp.
Latex-Ite, "Aggregate Filled Acrylic Color System Product Specifications", brochure, 1997, 3 pp.
"Material Safety Data Sheet" brochure, Jan. 15, 2003, 2 pp.

* cited by examiner

FILLER FOR ARTIFICIAL TURF SYSTEM

CROSS REFERENCE TO RELATED APPLICATIONS

This application is a Continuation-In-Part of application Ser. No.: 11/373,885 filed Mar. 13, 2006, which is a Continuation-In-Part of application Ser. No. 10/811,737 filed Mar. 29, 2004, now U.S. Pat. No. 7,144,609 B2, which is a Continuation-In-Part of application Ser. No. 10/422,129, filed Apr. 24, 2003, now U.S. Pat. No. 6,884,509, the subject matters of which are incorporated herewith.

BACKGROUND OF THE INVENTION

Artificial turf systems are old and well-known. The original systems had the problem of losing their resiliency over a substantially short period of time, after which they became unsatisfactory for certain uses. Another factor which creates problems is that certain fillers are not fireproof, and in fact, will burn, which creates a fire hazard. Finally, certain fillers contain dust and when used indoors, tend to pollute the atmosphere.

Accordingly, it is an object of the instant invention to provide a filler for use with an artificial turf system which will allow the system to be evenly resilient throughout.

Another object of the instant invention is to provide a filler for use with an artificial turf system which retains its resiliency over an extended period.

Another object of the invention is the provision of a filler which does not pack or mound.

Another object of the invention is the provision of a hydrophobic filler.

Another object of the invention is the provision of a hydrophobic filler which will not harbor bacteria.

Another object of the invention is the provision of a hydrophobic filler which may be recycled into other objects.

Another object of the invention is a filler which contains no sharp edges and can be of substantially evenly sized particles or varying sized particles.

Another object of the invention is the provision of a filler for artificial turf in which each granule is of a restricted size profile.

Another object of the invention is the provision of a filler which is non-flammable, dust free, non-absorbent and recyclable.

Another object of the invention is a filler which is formed from waste glass or recycled glass granules.

Another object of the invention is a filler which maintains a low G-max after extended use.

Another object of the invention is an artificial turf system with improved safety.

SUMMARY OF THE INVENTION

The instant invention is directed to a filler for use in an artificial turf system which may include a support layer, a base layer, and an outer layer. The support layer comprises an area of selected size which may consist of smoothed sand, compacted soil, fiber reinforced soil, gravel, asphalt, concrete or a combination thereof.

The base layer comprises at least one grid which consists of a plurality of interconnected cells arranged over and supported by the support layer. Each cell of the cells forming the grid comprises an upstanding tubular member having an upper portion of a first diameter, which functions to support the outer layer, and a lower portion of a second diameter, which functions to engage with the support layer. The lower portion provides the cell with vertical flexibility, which provides the artificial turf system with vertical movement during use. This vertical movement improves the ability of the turf system to absorb downward forces or impacts.

The outer layer includes pile secured with a backing fabric which is preferably supported on the transition layer. The pile may also be secured with a foam backing which may be supported directly on the upper surface of the mat. A filler is spread evenly over the pile fabric to cover the surface of the backing fabric and to surround and cover desired portions of the pile tufts. It is preferred that the filler is STF (coated silicon dioxide particles) or glass beads. The fillers may be combined with ground rubber or sand.

The pile tufts extending from the backing fabric are between ¼" to 4" in length and preferably formed of synthetic ribbons of between about 1/32" to 3/8" in width. The backing fabric is preferably formed of porous synthetic material which secures the pile tufts in fixed positions.

A preferred filler comprises substantially equal size glass beads formed of molten particles of crushed glass, referred to as cullet, or from glass dust or dust particles created during the glass crushing operation. The filler is interspersed over the backing fabric to fill around or about the tufts up to at least half their length. The glass beads may be polished. The glass beads are selectively sized to maintain an angle of repose of more than 25° which maintains porosity through the filler.

The glass beads may be colored one of brown, green, red, and black. They may comprise a combination of these colors or they may be natural color. The silicon dioxide and glass beads range in size between 6 and 80 mesh. The glass beads are substantially round and have no sharp edges. The glass beads are sized to be within about five mesh sizes and are spread over the pile tufts evenly to a depth of between 0.25" to 2.00." The glass beads are arranged over the backing at between 1 pounds and 6 pounds per square foot. The glass beads have a specific gravity of between 1.00-2.50.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Referring now in more detail to the drawings, the invention will now be described in more detail.

Figure 1:
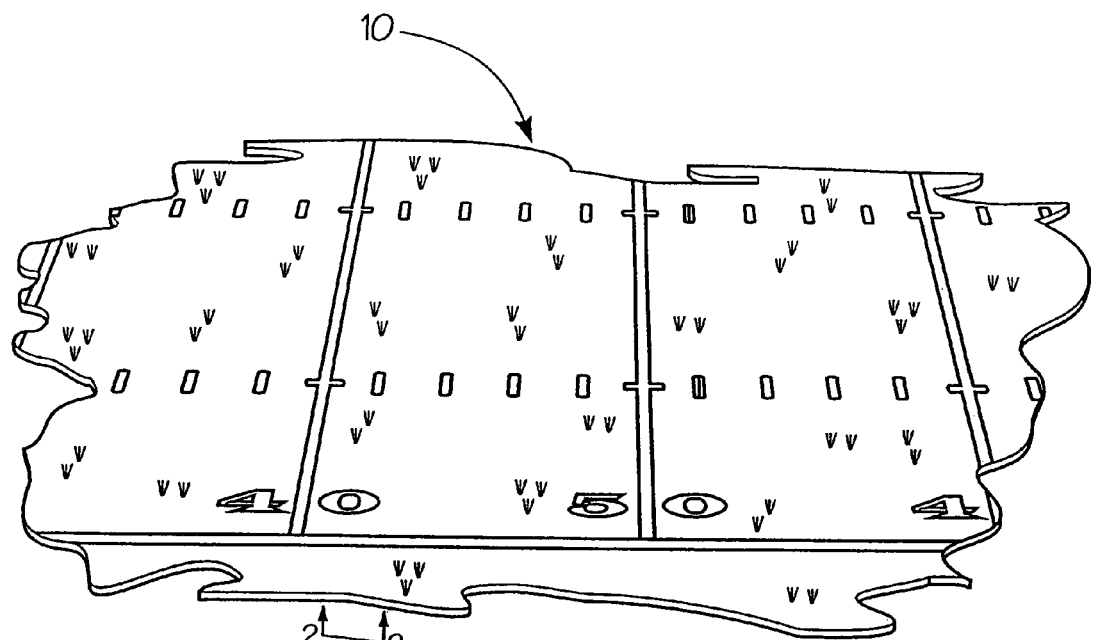
FIG. 1 is a perspective view of a sports field employing artificial turf.

The artificial turf system is designed to be usable for many different purposes such as sports surfaces, landscaping, equine facilities and the like. The sports surface illustrated in FIG. 1 is a ball field. The arrangement is equally adaptable as playgrounds, putting greens and track facilities. In order to function in these areas, the artificial turf system must be of proper firmness, be durable, have proper drainage capability, and be easily installed. In the case of sport and equine facilities, it is also necessary that the turf system have proper abrasiveness, traction, flame retardance and not present fungicidal problems. It is also most necessary that the field maintain an even surface and not pack or mound unnecessarily.

Turning now to FIGS. 2-5, an artificial turf system of the invention is shown broken into three components, i.e. outer layer A, base layer B and support layer C.

Support layer C may be no more than compacted soil or it may be comprised of crushed stone, crushed stone and sand, asphalt, concrete or a combination thereof. This layer is identified as support base 12.

It may be desirable to place a stabilizer sheet 14 over base 12. Stabilizer sheet 14 is a flexible non-porous plastic sheet which assists with drainage and provides a stabilizing support for grid system 16.

Base layer B is positioned over and is supported on support layer C. Base layer B includes a mat which is made up of a plurality of grids 16 connected together. The mat is preferably formed to conform with the shape of support layer C. There could be a plurality of mats laid side-by-side over an extremely large support layer.

Each grid 16 is formed of a plurality of interconnected cells 18 which comprise cylinders formed of semi-rigid or semi-flexible plastic. Grids 16 are preferably formed in rectangular or square segments, however, any polygonal shape is acceptable. Cells 18 are more fully described in co-pending application Ser. No. 10/811,737 earlier referred to.

Upper section 20 of each cell 18 has an upper end 21 which is generally designed to engage with outer layer A. Vents 23 are formed about the periphery of the upper section to allow hot air to exit the cylinder.

Lower section 22 of each cell 18 extends radially downward and outward from the lower end of upper section 20 forming a cone-shaped lower section. Lower section 22 extends from the vertical axis of the cell at an angle of about 75°. Lower section 22 may have a continuous radial surface or it may be in the form of a plurality of radially extending members. In either instance, lower section 22 provides resilience or movement of a cell in the vertical direction when it is impacted with weight. The degree of downward movement from its normal height x to a compressed height y or between $\frac{1}{16}$" and $\frac{1}{8}$."

Cylinders 18 preferably extend vertically to about 1" in height with the upper portion being bout $\frac{3}{4}$" and the lower portion about $\frac{1}{4}$."

Grids 16 comprise a plurality of cells 18 which are interconnected by securing members. The securing members engage with the adjacent cell peripheries, preferably the lower edge of lower section 22. The cells forming a grid are arranged along opposed axes with each axis being separated by about 4."

The securing members are generally diamond shaped and comprise flexible synthetic filaments or rods interconnected to allow vertical, diagonal and horizontal movement between the adjacent cells. This flexibility allows the cells forming the grids to conform with the topography of the support layer, insuring even engagement between each cell and the support layer.

In use, grids 16 which may also be integrally formed, preferably by molding, are interconnected forming mat 16 or a plurality of mats which then are placed over support layer C. The lower ends of lower portions 22 are positioned in engagement with support layer 12 or with stabilizer sheet 14.

Figure 4:
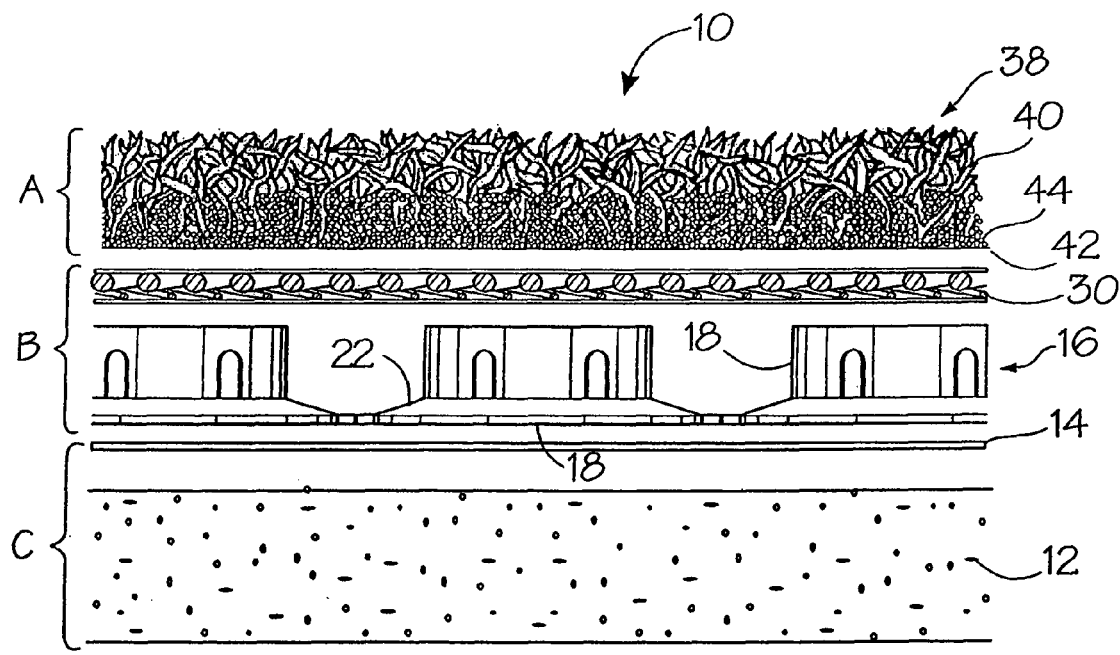
FIG. 4 is an exploded cutaway side view of a first arrangement of the artificial turf system of the invention.
Figure 6:
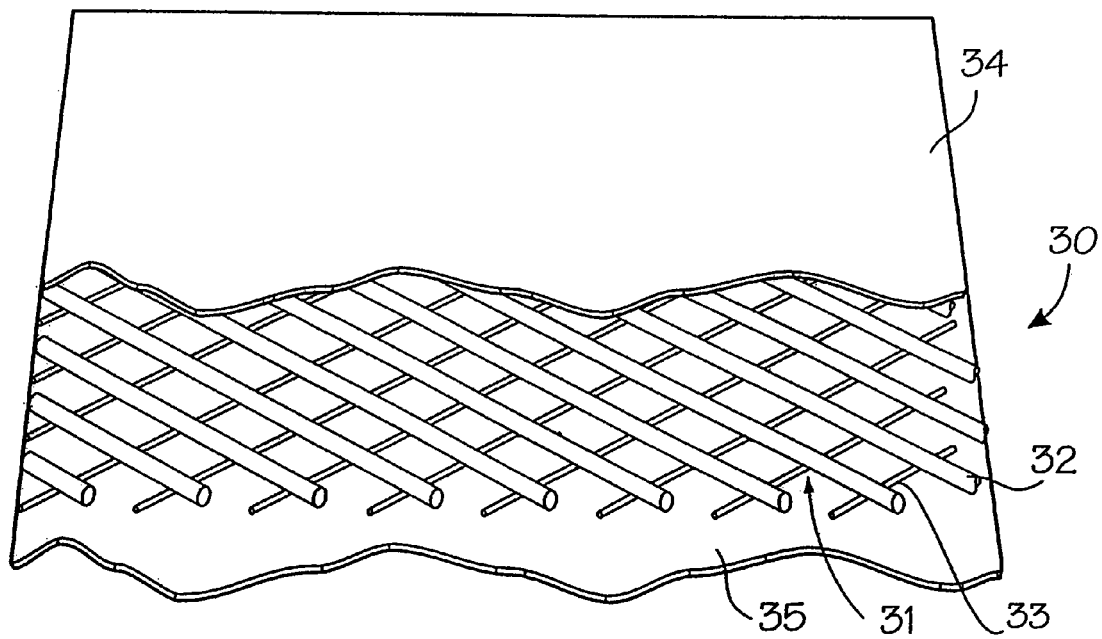
FIG. 6 is a sectional view of the transition layer.

In certain instances, base layer B includes a transition layer 30 as best shown in FIGS. 4 and 6. Transition layer 30 preferably consists of a screen or grate 31 which is formed of diagonally disposed semi-rigid synthetic rods or filaments 32, 33 having a diameter of between 1 mm and 6 mm. Generally rods 32 are of larger diameter than rods 33, however, this is not necessarily so. Preferably, the rods are formed of polyethylene. It is preferred that screen 31 be a unitary molded unit sized to match the grid size. They could be made in larger sheets and cut to size. Also they could be synthetic filaments bonded together. It is only necessary that screen 31 be sufficiently rigid to assist the cells in supporting the outer layer and yet provide sufficient vertical give to improve the resilience against impact of the artificial turf system.

Preferably felts 34, 35, which are formed of synthetic yarns, are positioned to be secured with the top and bottom surfaces of screen 31. Felts 34, 35 are formed to be between 4 and 10 ounces per square yard. The felts must be sufficiently porous to provide drainage from the outer layer through the base layer. The transition layer primarily assists in providing uniform vertical support of the outer layer while the felts provide padding which assists in reducing wear between the outer layer and the tops of the coils.

Figure 2:
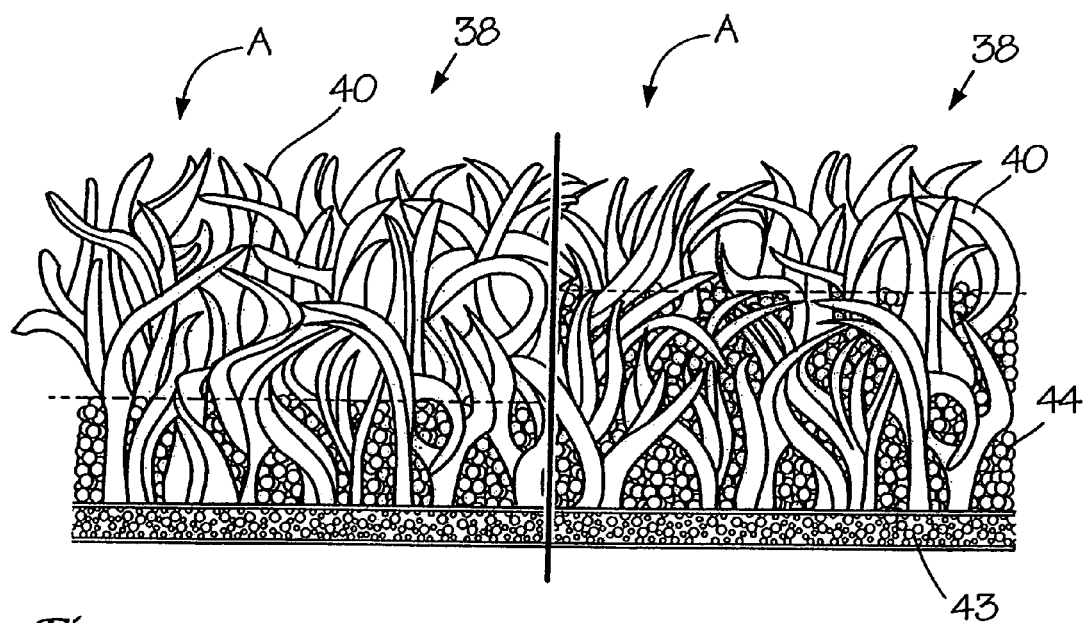
FIG. 2 is an exploded cutaway side view of a first arrangement of the filler in use with an artificial turf system of the invention.
Figure 3:
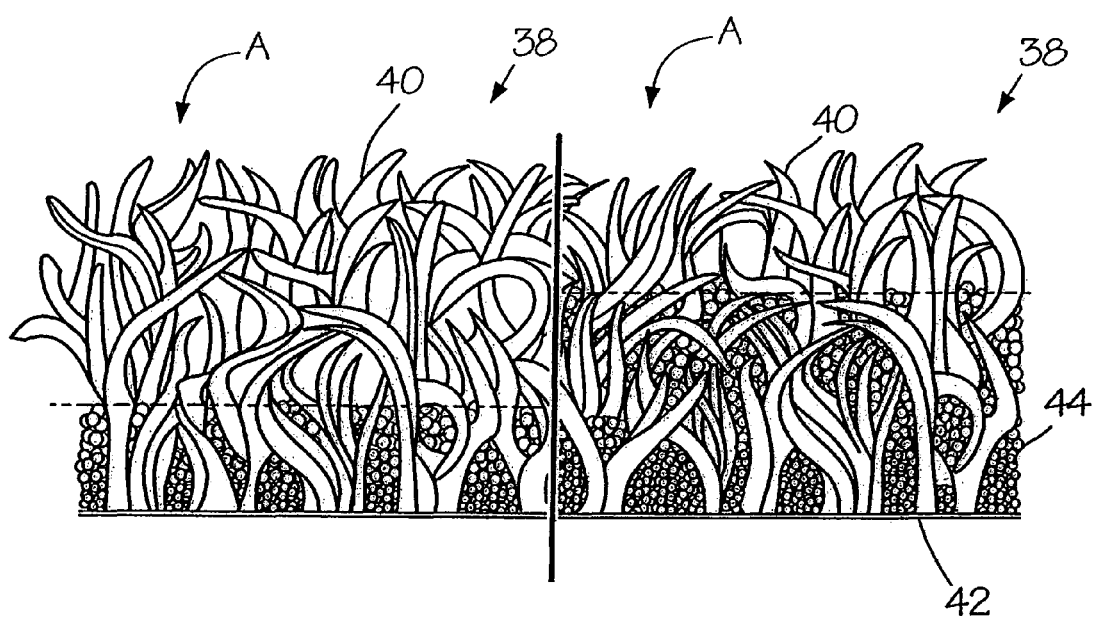
FIG. 3 is similar to FIG. 2, showing a second arrangement of the filler in use with a turf system of the invention.

Turning now to FIGS. 2 and 3, outer layer A comprises a pile fabric 38 which consists of pile tufts 40 secured with backing 42, 43.

Pile tufts 40 are preferably formed of polyethylene, polypropylene, nylon or a combination. The tuft forming synthetic filaments have a ribbon-like cross-section of between about $\frac{1}{32}$" to $\frac{3}{8}$" in width. The pile tufts are formed to a height, which may be uniform or may vary, of between $\frac{1}{4}$" to 4." The pile tufts are secured with backing fabric 42, 43 by tufting, weaving, braiding or bonding as desired.

Figure 5:
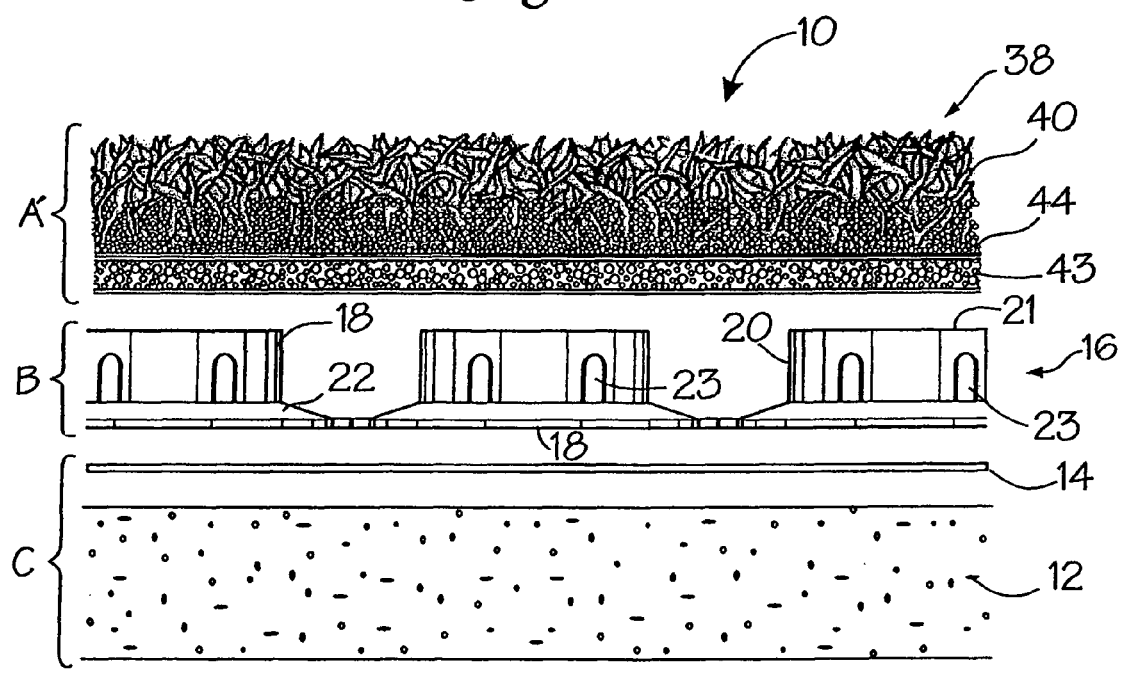
FIG. 5 is similar to FIG. 4 showing a second arrangement of the artificial turf system of the invention.

The backing is preferably a porous textile fabric as shown at 42. When the fabric is employed to retain the tufts, it is desirable that transition layer 30, as shown in FIGS. 4 and 6, be positioned between the backing fabric and grid 16 or support layer C, so that backing fabric 42 is supported on the transition layer. Alternatively, the backing may comprise a $\frac{1}{2}$" composite foam and fabric sheet 43 as shown in FIGS. 2 and 5. Backing 43 is preferably a polyurethane, polyethylene or latex sheet between 1 cm and 2 cm thick. When using backing 43, it is normally not necessary to provide transition layer 30 as backing 43 provides sufficient support or vertical resilience. In both instances, it is desirable that the backing material be porous.

A filler 44 is distributed evenly over backing 42, 43 and about pile tufts 40. In FIG. 2, filler 44 comprises evenly sized beads with the pile tufts extending above the filler by between $\frac{1}{3}$ and $\frac{2}{3}$ and preferably between $\frac{1}{4}$ and $\frac{3}{4}$ of their length, while in FIG. 3, filler 44 comprises variable sized beads which extends along the length the pile tufts as in FIG. 2. The filler is applied to a depth of between 0.25" to 2.00" depending upon the need. It is noted that the smaller size beads always work to the bottom, which results in the area adjacent the backing being less porous, which causes uneven drainage. This is why size control is so important.

Figure 7:
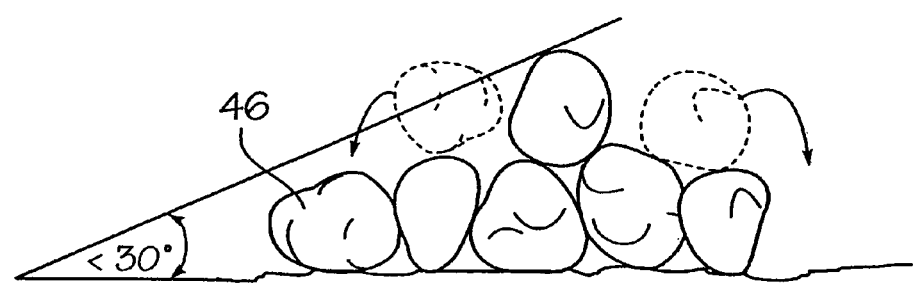
FIG. 7 is a cutaway side view of the angle of repose of the silicon dioxide beads.
Figure 9:
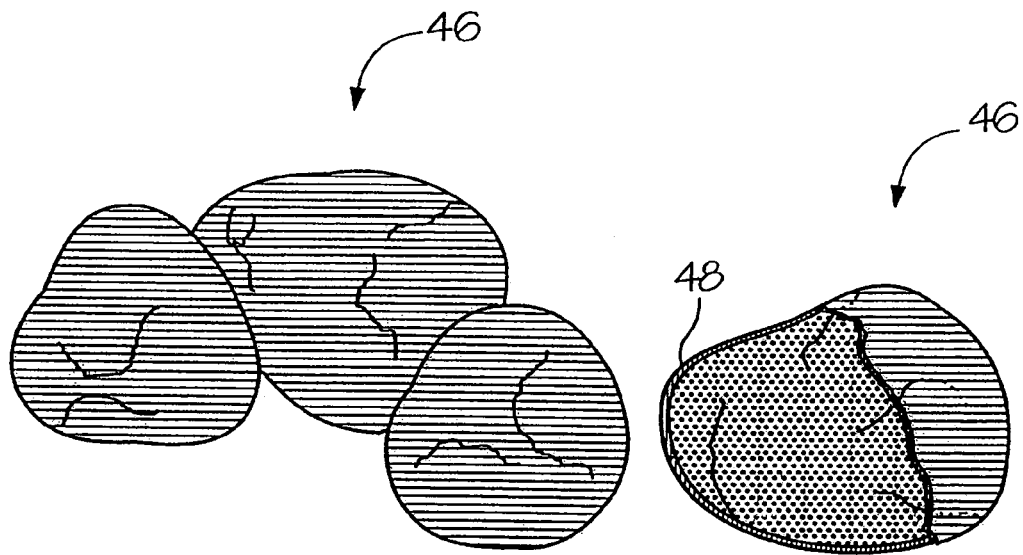
FIG. 9 is an exploded view of the coated silicon dioxide beads of the invention.

It has been found that a filler of silicon dioxide beads or particles, coated to have a non-porous outer surface as shown in FIGS. 7 and 9, are very desirable. These beads or particles are rounded with no sharp edges. They are sized and cleaned, prior to coating, to be between 8 and 60 mesh and are substantially dust free. Due to the roundness of the particles of silicon dioxide and the sizing to between 8 and 60 mesh, this filler does not pill or mound and maintains an angle of repose of about 30° as shown in FIG. 7. This feature, while maintaining an even surface, assists tremendously in maintaining even porosity and a constant G-force factor.

As noted above, silicon dioxide beads 46 are slightly porous. Because of the porosity, it is desirable to coat the outer surfaces thereof with an acrylic sealer 48 as shown in FIG. 9. Other sealers may be used if desired. The sealed coated silicon dioxide particles or beads are also referred to as STF.

The silicon beads are formed normally with a natural color. It may also be desirable to color the silicon beads to enhance the appearance of the artificial turf. Desirable colorants are iron oxide for black and chromium (III) oxide ($Cr_2O_3$) for green. Other natural colorants are available for other colors or shades.

Figure 8:
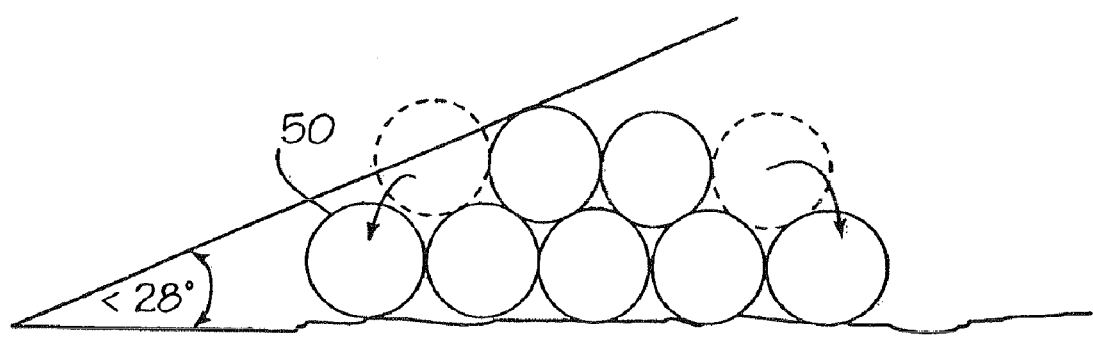
FIG. 8 is a cutaway side view of the angle of repose of the glass beads.
Figure 10:
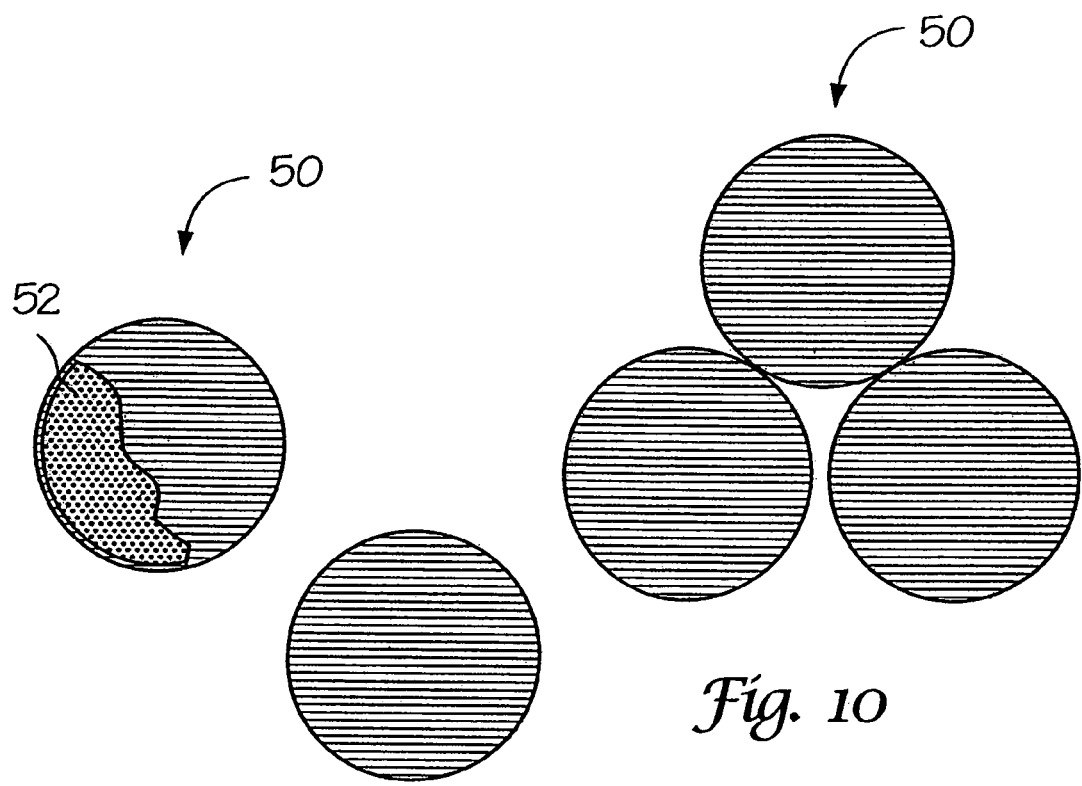
FIG. 10 is an exploded view of the glass beads of the invention.
Figure 11:
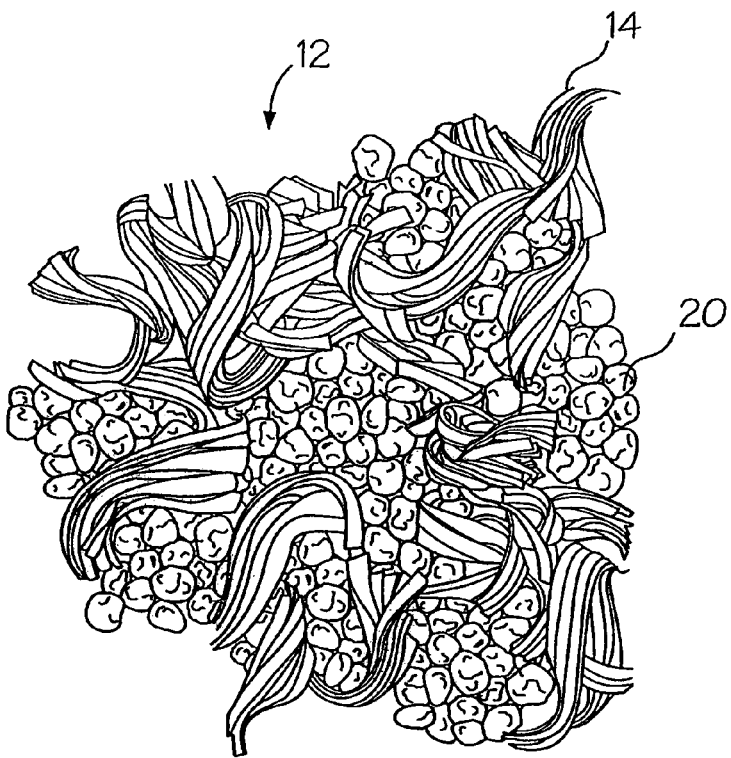
FIG. 11 is a top sectional view of the silicon dioxide beads surrounding and supporting pile tufts.
Figure 12:
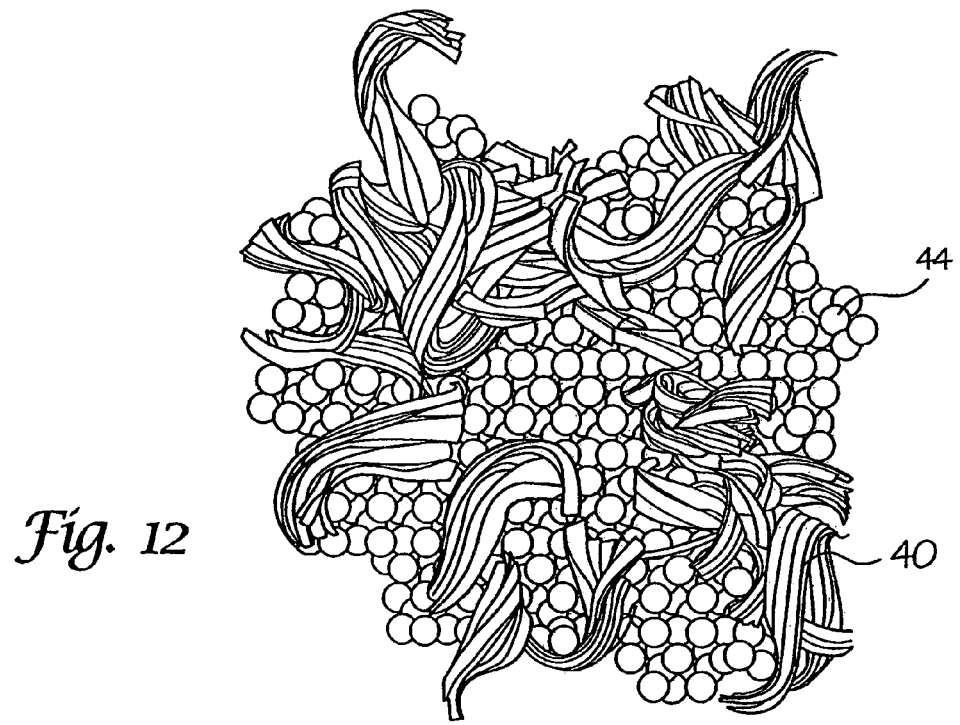
FIG. 12 is similar to FIG. 11 showing the glass beads surrounding and supporting pile tufts.

An equally desirable filler is one utilizing glass beads 50 as shown in FIGS. 8 and 10, which provide an excellent improvement over the current standard fillers, i.e. sand and recycled rubber. Glass beads are affordable, they are clean, they do not produce dust, they are non-porous, they do not burn and they do not maintain moisture. Therefore, they do not harbor bacteria. Furthermore, glass beads may be recycled back into glass and reformed for other uses.

It is preferred that discarded glass or glass waste be used to form the glass beads. Glass in this form is called "cullet." Normally, the cullet is first crushed, forming glass granules and glass dust. The granules are generally formed to a size of between 6 and 80 mesh with a specific gravity of 2.50+. The glass dust comprises extremely fine glass particles, ranging between 80 to 300 mesh, with each particle having a specific gravity of at least 1.00+.

The processed or crushed granules are passed through screens of selected sizes which isolates the granules into generally equal sized groups. The preferred size is between 0.25 mm and 5 mm or between 8 and 60 mesh. The sized groups of granules are then individually heated until the granules are in a slightly less than molten state. The almost molten granules are tumbled until they form glass beads which are round and have no sharp edges.

The crushed glass dust or particles have been formed into minute sizes, which range between 80 and 300 mesh. The glass dust or particles are formed into beads by heating the glass particles until they are slightly less than molten and tumbling the heated glass particles until beads which have no sharp edges and are between 6 and 80 mesh are formed.

In the case of forming beads from glass dust, it is noted that waste polymer products such as waste polypropylene filaments, polyethylene filaments or nylon filaments may be combined with the glass dust during heating and tumbling. The waste polymers adhere with the glass dust particles, enlarging their size, changing their appearance and outer texture. The beads formed of the combination of glass and synthetic polymers are smooth, water proof, resist abrasion, and may be colored, dependent upon the polymers. The beads formed from the glass dust or particles or from the glass dust and waste synthetic polymers are formed to be between 6 and 80 mesh. The above polymers may also be utilized in the treatment of the crushed particles.

Other substances may be combined with the beads or particles during treating and tumbling, depending upon the desired use, texture, odor and color of the beads. These substances include natural or synthetic rubber, various plastic polymers, silver ions or nitrate, various fragrances, ultraviolet stabilizers, color pigment, ultraviolet stabilizers, a coolant and combinations of the above.

The processes for forming the glass beads, whether from crushed cullet or dust, are known and are employed by Viceroy Ceramics, Dlubak Glass and others.

Glass beads 50, whether formed from cullet or dust, may be coated with synthetic polymer 52 to enhance the smoothness and lower the co-efficient of friction of their outer surface. Polymer 52 may be of the group consisting of epoxy, acrylic, urethane or Teflon® (e.g., a polytetrafluoroethylene).

Due to their low co-efficient of friction and their smooth outer surface, glass beads 50 maintain an angle of repose of less than 28° as indicated in FIG. 8 which is slightly better than the angle of repose of the silicon dioxide beads. Glass beads 50, because they do not pill but retain such a slight angle of repose, provide a more continuous and equal drainage throughout than other known products such as rubber or sand.

The glass beads, even those coated with a synthetic polymer, have a hardness of at least six on the Mohls scale and provide permanent low G-max levels in the artificial turf system.

It is noted that satisfactory results have been achieved when using mixtures of silicon dioxide or glass beads mixed with ground rubber or with sand. The ratios are dependent upon the intended use and may be achieved by trial and error.

Artificial turf systems when installed must be sufficiently stable so as to maintain a generally even outer surface. These systems must also be resilient within limits so that the stability of the surface is sufficiently hard so as to provide positive footing and yet is sufficiently resilient to provide sufficient give so as to not cause undue injury.

There have been tests developed to determine the physical capabilities of artificial turf systems. An industry accepted test for determining the resiliency or shock absorbing capability of artificial turf is conducted by TSI, i.e. Testing Services Inc. of Dalton, Ga. TSI conducts tests which reveal the G-max of an artificial turf system when installed and the G-max of that system after extended time or use.

For an artificial turf system to be acceptable, the G-max must be and remain within the range of 90 to 120.

Tests conducted on the artificial turf systems, using the combinations of fillers or beads as above described, provided results indicating that the systems, as installed, possessed a G-max of about 100, and as such, are at a very acceptable level of hardness. Continued testing over time, which equates with extended use when installed, resulted in an initial increase in G-max of between 5 and 14%, and generally about 7% with the system using silicon dioxide beads 46. With the system using glass beads 50, the initial increase in G-max was generally about 5%. The synthetic turf systems of the invention substantially retained this G-max of between 5% and 7% through extended further testing. The G-max for the system, after extended use, using silicon dioxide beads 46 held a G-max of about 110, while the system using glass beads 50 held a G-max of about 100. A G-max of between 105 and 114 is most acceptable.

It is noted that silicone silicon dioxide beads 46 or the glass beads 50 have been tested with synthetic turf systems other than the ones herein disclosed with equally impressive results as pertains to retention of G-max, porosity and angle of repose.

Other artificial turf systems using sand or ground rubber have also been tested by TSI. The results of these tests indicated an initial G-Max of about 100. However, with continued testing over time, the G-Max of these products showed a continuous increase of up to between 25% to 40%, well above the accepted limit. This increase in the G-Max indicates that these tested turf systems, in a short space in time, would degrade to the point of becoming unsatisfactorily hard, requiring replacement.

While preferred embodiments of the invention have been described using specific terms, such description is for illustrative purposes only, and it is to be understood that changes and variations may be made without departing from the spirit or scope of the following claims.

What is claimed is:

1. A method of producing synthetic athletic field and landscape using environmentally safe aggregate filler formed of glass beads comprising:
    crushing glass cullet and passing said crushed glass into a heating chamber;
    heating said crushed glass to a state slightly less than molten and tumbling said heated crushed glass until substantially round beads are formed;
    coating said substantially round beads following said heating and tumbling;
    sizing said beads to be between five mesh sizes;
    providing a backing fabric carrying synthetic tufts of between about 1" and 4" extending upward for a first surface;
    evenly applying said beads onto said first surface of said backing fabric providing a non-pilling filler in an amount weighing between about 1 and 6 pounds per square foot; and
    providing that said beads are disposed between and around said tufts to maintain said tufts erect and above said beads while providing a substantially level upper surface with even drainage throughout.

2. The method of claim 1 including mixing synthetic polymers with said slightly less than molten crushed glass prior to tumbling.

3. The method of claim 1 including forming said cullet from at least one of broken, discarded and recycled glass.

4. The method of claim 1 including foaming said glass beads to be between 8 and 60 mesh.

5. The method of claim 1 providing that said crushed glass comprise glass dust of between 80 and 300 mesh prior to tumbling 6. The method of claim 5 including forming said glass beads to be between 6 and 80 mesh.

7. The method of claim 5 including mixing synthetic polymers with said glass dust during tumbling.

8. A method of producing an artificial turf including a support layer, a base layer and an outer layer including a backing, said method comprising:
    providing a stabilizer sheet over the entire area comprising said support layer;
    providing said base layer that comprises a mat formed of interconnected cells and positioning said mat on said stabilizer sheet;
    forming pile tufts of synthetic ribbons of between 1" to 4" in length and securing said tufts with said backing of said outer layer and positioning said outer layer on said base layer; and
    providing a filler comprised of coated glass beads having no rough edges or projections and sized to be within about five mesh sizes and evenly spreading said filler over said backing and about said pile tufts wherein said coated glass beads are substantially round and are spread over said backing at between 4 and 6 pounds per square foot; whereby,
    said support layer, said base layer and said outer layer combine to provide said artificial turf with a permanent G-max within about 20% of a G-max of 100.

9. A method of producing artificial turf for use with an artificial turf system providing a base layer and a support layer, said method comprising:
    providing a backing for supporting synthetic extrusions comprising pile tufts of between 1" and 4" in length on the base and support layers;
    securing said pile tufts in position with said backing;
    providing a non-pilling filler of coated glass beads and evenly distributing said glass beads over said backing and about said tufts at between 1 and 6 pounds per square foot and to a depth which covers between ¼" to ¾" of said tuft length causing said filler to maintain said tufts in an upstanding position while maintaining equal porosity through said artificial turf.

10. The method of claim 9 including providing said glass beads are substantially round and maintain an angle of repose less than 28°.

11. The method of claim 9 including providing said glass beads that are between 8 and 60 mesh.

12. The method of claim 9 including providing said glass beads that are within five mesh sizes.

13. The method of claim 9 including providing said glass beads coated with a synthetic polymer selected from a group consisting of epoxy, acrylic, urethane, and polytetrafluoroethylene.

14. The method of claim 9 including providing said glass beads include one of silver ions and nitrate.

15. The method of claim 9 including providing said glass beads include color pigment.

16. The method of claim 9 including providing said glass beads include fragrances.

17. The method of claim 9 including providing said glass beads include an ultraviolet stabilizer.

18. The method of claim 9 including providing said glass beads include a coolant.

19. A method of producing an artificial turf system on a base, comprising:
    installing a backing on the base, the backing including synthetic extrusions comprising pile tufts of between about 1" and 4" in length secured to and extending upwardly from the backing; and
    evenly distributing over the backing a non-pilling filler of coated glass beads at between about 1 and 6 pounds per square foot and to a depth which covers between about ¼" to ¾" of the tuft length, whereby the filler maintains the tufts in upstanding position while maintaining equal porosity throughout the artificial turf.

20. The method of claim 19 wherein the coated glass beads are substantially round and maintain an angle of repose of no more than about 28°.

21. The method of claim 19 wherein the coated glass beads are between 8 and 60 mesh.

22. The method of claim 19 wherein the coated glass beads are within five mesh sizes.

23. The method of claim 19 wherein the coated glass beads include a synthetic polymer selected from a group consisting of epoxy, acrylic, urethane, and polytetrafluoroethylene.

24. The method of claim 19 wherein the coated glass beads include one of silver ions and nitrate.

25. The method of claim 19 wherein the coated glass beads include a color pigment.

26. The method of claim 19 wherein the coated glass beads include a fragrance.

27. The method of claim 19 including wherein the coated glass beads include an ultraviolet stabilizer.

28. The method of claim 19 wherein the coated glass beads include a coolant.

29. The method of claim 19 further comprising:
installing a foam sheet on the base, prior to installing the backing, the foam sheet supporting the backing.

30. The method of claim 29 further comprising:
installing a grid cell layer on the base, prior to installing the foam sheet, the grid cell layer supporting the foam sheet.

31. A method of producing an artificial turf for an athletic field or a landscape, using environmentally safe aggregate filler, comprising:
placing a backing on a foundation, the backing carrying synthetic tufts of between about 1" and 4" extending upwardly from a first surface thereof; and
evenly applying on the first surface of the backing a layer of non-pilling filler in an amount weighing between about 1 and 6 pounds per square foot, the non-pilling filler comprising coated glass beads, wherein the coated beads are rounded and of a restricted size profile of between about 6 and 80 mesh, non-porous, water repelling, non-compacting, and have an angle of repose of no more than about 30 degrees, the beads disposed between and around the tufts to maintain the tufts erect and above the beads while providing substantially even drainage throughout the layer of filler, the athletic turf retaining a relatively constant G-max.

32. The method of claim 31 wherein the glass beads have been formed by:
crushing glass cullet and passing the crushed glass into a heating chamber;
heating the crushed glass to a state slightly less than molten and tumbling the heated crushed glass until substantially round beads are formed; and
coating the beads.

33. The method of claim 31 further comprising:
installing a foam sheet on the base, prior to placing the backing, the foam sheet supporting the backing.

34. The method of claim 31 wherein the coated beads forming the layer of the filler are within 5 mesh sizes and substantially dust free.

* * * * *

UNITED STATES PATENT AND TRADEMARK OFFICE
CERTIFICATE OF CORRECTION

| | | |
|---|---|---|
| PATENT NO. | : 7,858,148 B2 | Page 1 of 1 |
| APPLICATION NO. | : 11/713891 | |
| DATED | : December 28, 2010 | |
| INVENTOR(S) | : Randolph S. Reddick | |

It is certified that error appears in the above-identified patent and that said Letters Patent is hereby corrected as shown below:

Col. 2, Title page, Abstract, "A filler of...are interspersed over" should read --A filler of. . .is interspersed over--.

Col. 2, Title page, Abstract, ". . . at least half thick length." should read --. . .at least half their length.--.

IN THE SPECIFICATIONS:

Col. 3, line approx. 59-60, ". . .downward movement from its..." should read --. . .downward movement is from its. . .--.

Col. 5, line approx. 6-8, ". . .a filler of. . . are very desirable" should read --. . .a filler of. . .is very desirable--.

Col. 7, line 1, ". . .noted that silicone silicon dioxide beads. . ." should read --. . .noted that silicon dioxide beads. . .--.

IN THE CLAIMS:

Col. 7, line 48, CLAIM 4, ". . .including foaming said glass. . ." should read --. . .including forming said glass. . .--.

Col. 7, line 57, CLAIM 6, "between 6 and 80 mesh." should read --between 8 and 60 mesh.--.

Col. 10, line 6, CLAIM 31, "between about 6 and 80 mesh," should read --between about 8 and 60 mesh,--.

Signed and Sealed this
Third Day of May, 2011

David J. Kappos
*Director of the United States Patent and Trademark Office*